UNITED STATES PATENT OFFICE.

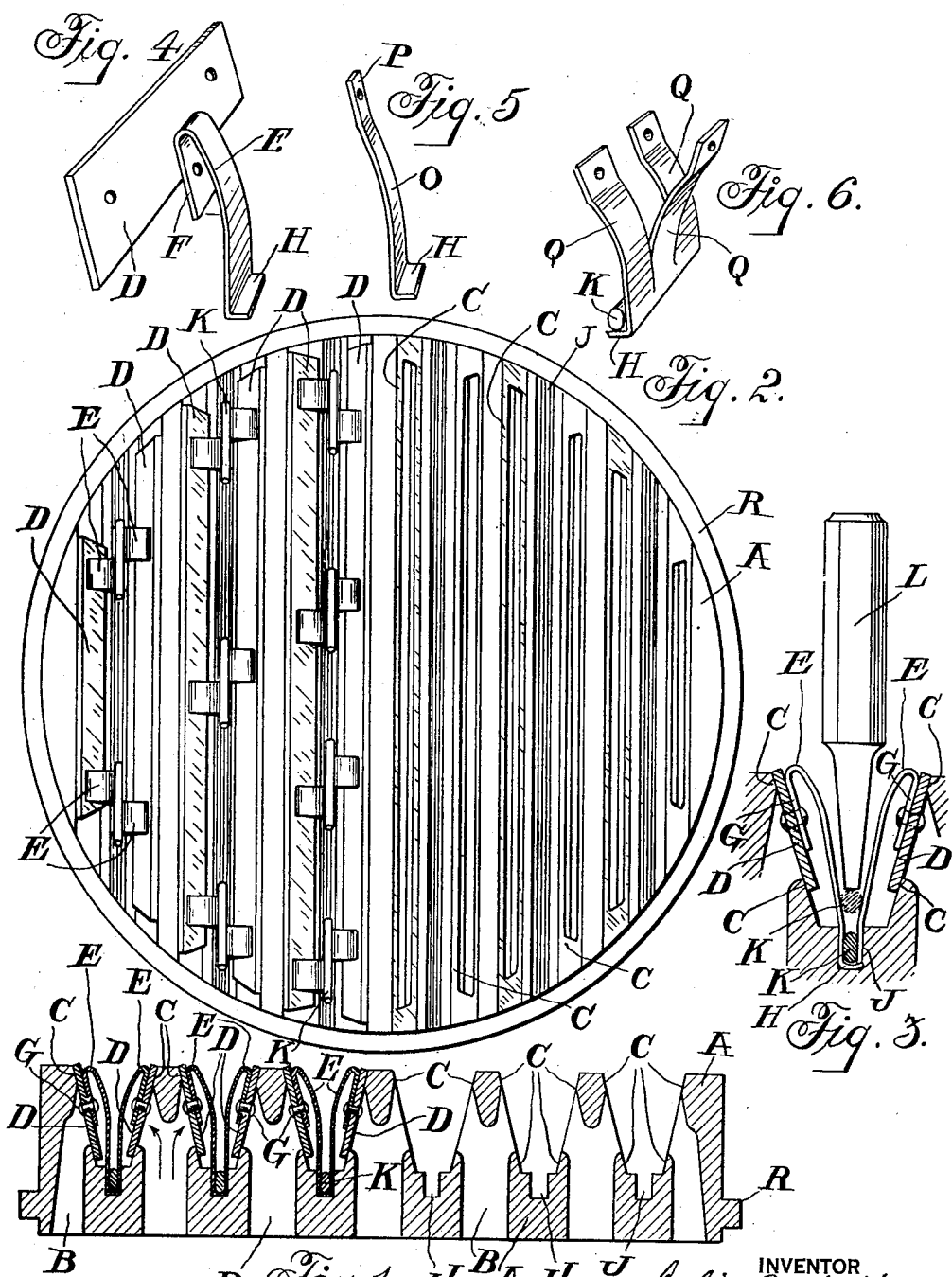

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

PLATE-VALVE.

1,375,252.  Specification of Letters Patent.  Patented Apr. 19, 1921.

Application filed April 6, 1920. Serial No. 371,596.

*To all whom it may concern:*

Be it known that I, LESLIE R. HUFF, a citizen of the United States, residing at Phillipsburg, in the county of Warren and State of New Jersey, have invented a certain new and useful Improvement in Plate-Valves, of which the following is a specification.

This invention relates to plate valves for blowing engines, air, gas, or ammonia compressors and liquid pumps, and includes check valves for checking air, gas or liquid.

The objects of the invention are primarily to obtain the maximum amount of opening for the passage of the fluid in a valve of this type, and avoid abrupt deflections of the fluid, thus obtaining a straighter flow and less velocity and pressure drop.

Further objects of the invention are to limit an objectionable degree of valve plate lift, enable the springs which act to hold the valve plates in place to perform the additional function of restricting the degree of opening of the valves to that required to insure free passage to fluid, construct the valve plate seats so that the valve plates may assume positions in planes substantially parallel to the longitudinal axis of the valve during the passage of fluid and also partly relieve the fluid of the duty of moving the valve plates against their own weight, and provide light and efficient valve plates under light spring load, offering slight resistance to pressure, but affording prompt closure always in the same positions on the seats.

Further objects will hereinafter appear and to all of these ends the invention consists of the preferred constructions illustrated in the accompanying drawings in which—

Figure 1 is a transverse sectional view of the valve taken on a broken line through the valve seat, valve plates, and springs, in order to show the attachment of the springs and plates.

Fig. 2 is a top plan view.

Fig. 3 is an enlarged detail transverse sectional view broken away showing one method of securing the valve springs to the valve seat.

Fig. 4 is a detail perspective view of a valve plate and the form of valve spring shown in Figs. 1, 2 and 3.

Fig. 5 is a detail perspective view of a modified form of spring, and

Fig. 6 is a detail perspective view of another modified form of spring.

Referring to the drawings, A represents a valve seat preferably circular in form and provided with the fluid passageways B. The valve seat is formed with the flat seating surfaces C inclined at an angle to the longitudinal axis of the valve and rigid valve plates D are adapted to be seated on said inclined surfaces C over the passageways B, and supported and guided by springs E. The valve seat is provided with a securing flange R extending around the edge.

In the preferred form of the invention shown, the inclined seating surfaces C may be provided by constructing the valve seat A with parallel V-shaped grooves extending across one face of the valve seat from edge to edge and having diverging sides forming surfaces C. The springs E may be like those shown in Figs. 1 and 4, consisting of bent pieces of spring metal having the reversely bent ends F adapted to be secured to the valve plates D as by means of the rivets G and also provided with the hook shaped toes H. The hook shaped toes H are adapted to be inserted in the slots J in the bases of the V-shaped grooves and secured in position by forcing metallic strips or metallic wire K into the slots J between the springs by means of a tool L as indicated in Fig. 3. The grooves and slots preferably lie wholly outside the plane of the flange R in order to facilitate machining.

The springs may also be like that shown in Fig. 5 at O having the straight end P adapted to be secured directly to a valve plate. If desired, a plurality of spring arms Q may be cut out of a continuous piece of metal and bent alternately at each side as indicated in Fig. 6.

In the operation of the valve, which may be either a discharge valve, an inlet valve or a check valve, it will be seen that the fluid has a free passage through the passageways B and through the openings in the inclined seating surfaces C when the valve plates are open. The springs serve to support and guide the valve plates and return the valve plates to their seats. In open position, the valve plates lie in planes substantially parallel to the longitudinal axis of the valve and in the direction of flow of the fluid so that the least obstruction possible is afforded to the passage of the fluid.

This form of valve facilitates and economizes in the manufacture of blowing, compression or pumping cylinders or check valve bodies since the construction does not require expensive tools or dies and fixtures. The valves are easily installed at first installation and their simplicity in construction requires a minimum of machine operations.

The passageways B and the openings in the inclined valve seating surfaces C may be continuous across the valve seat, as shown in Fig. 2, or they may be of various lengths separated by bridges as desired, and the valve plates may be of different lengths, conforming to the valve openings.

I claim—

1. A plate valve comprising a valve seat having passage ways, flat seating surfaces inclined at an angle to the longitudinal axis of the valve, rigid valve plates adapted to be seated on said inclined surfaces over the passage ways, and spring arms supported on the valve seat and operatively connected to the valve plates, said valve plates assuming positions lying in planes substantially parallel to the longitudinal axis of the valve during the passage of fluid.

2. A plate valve comprising a valve seat having passage ways, flat seating surfaces inclined at an angle to the longitudinal axis of the valve, rigid valve plates adapted to be seated on said inclined surfaces over the passage ways, and spring arms fastened to the valve seat at one end and connected to the valve plates at the other ends, said valve plates assuming positions lying in planes substantially parallel to the longitudinal axis of the valve during the passage of fluid.

3. A plate valve comprising a valve seat having passage ways, sets of diverging flat seating surfaces at one face of the valve seat, said surfaces being inclined to the longitudinal axis of the valve, rigid valve plates adapted to be seated on said seating surfaces, and spring arms secured to the valve seat at one end between said inclined seating surfaces and connected to the valve plates at the other ends, said valve plates assuming positions lying in planes substantially parallel to the longitudinal axis of the valve during the passage of fluid.

4. A plate valve comprising a valve seat having passage ways, grooves in said valve seat having diverging sides forming inclined flat seating surfaces, rigid valve plates adapted to be seated on said inclined surfaces over said passage ways, and resilient guiding means for said valve plates, said valve plates assuming positions lying in planes substantially parallel to the longitudinal axis of the valve during the passage of fluid.

5. A plate valve comprising a valve seat having passage ways, grooves in said valve seat having diverging sides forming inclined flat seating surfaces, rigid valve plates adapted to be seated on said inclined surfaces over said passage ways, and spring arms secured to the valve seat at one end in said grooves and connected to the valve plates at the other ends, said valve plates assuming positions lying in planes substantially parallel to the longitudinal axis of the valve during the passage of fluid.

6. A plate valve comprising a valve seat having passage ways, grooves in said valve seat having diverging sides forming inclined flat seating surfaces, rigid valve plates adapted to be seated on said inclined surfaces over said passage ways, slots along the bases of said grooves, and spring arms secured to the valve seat at one end in said slots and connected to the valve plates at the other ends, said valve plates assuming positions lying in planes substantially parallel to the longitudinal axis of the valve during the passage of fluid.

7. A removable valve seat for plate valves, circular in form, having a flange extending around the edge, a plurality of parallel V shaped grooves extending across one face from edge to edge, the inclined sides of said grooves forming flat valve seats and passageways extending from said inclined sides through the valve seat to the opposite face of the valve, and rigid valve plates seating on said inclined sides and controlling said passageways, said valve plates assuming positions lying in planes substantially parallel to the longitudinal axis of the valve during the passage of fluid.

8. A removable valve seat for plate valves, circular in form, having a flange extending around the edge, a plurality of parallel V shaped grooves extending across one face from edge to edge, the said grooves lying wholly outside of the plane of the said flange, the inclined sides of said grooves forming flat valve seats and passageways extending from said inclined sides through the valve seat to the opposite face of the valve, and rigid valve plates seating on said inclined sides and controlling said passageways, said valve plates assuming positions lying in planes substantially parallel to the longitudinal axis of the valve during the passage of fluid.

9. A removable valve seat for plate valves, circular in form, having a flange extending around the edge, a plurality of parallel V shaped grooves extending across one face from edge to edge, the inclined sides of said grooves forming flat valve seats and passageways extending from said inclined sides through the valve seat to the opposite face of the valve, and rigid valve plates seating on said inclined sides and controlling said passageways, and slots in the bottoms of the grooves for securing valve plate springs, and springs connected to said valve plates and secured in said slots, said valve plates assuming positions lying in planes substantially parallel to the longitudinal axis of the valve during the passage of fluid.

10. A removable valve seat for plate valves, circular in form, having a flange extending around the edge, a plurality of parallel V shaped grooves extending across one face from edge to edge, the inclined sides of said grooves forming flat valve seats and passageways extending from said inclined sides through the valve seat to the opposite face of the valve, and rigid valve plates seating on said inclined sides and controlling said passageways, slots in the bottoms of the grooves for securing valve plate springs, and springs connected to said valve plates and secured in said slots, the said slots and grooves lying wholly outside the plane of the said flange, said valve plates assuming positions lying in planes substantially parallel to the longitudinal axis of the valve during the passage of fluid.

In testimony whereof, I have hereunto set my hand.

LESLIE R. HUFF.